United States Patent
Swanson

(10) Patent No.: US 9,264,524 B2
(45) Date of Patent: *Feb. 16, 2016

(54) MICROPHONE ARRAY TRANSDUCER FOR ACOUSTIC MUSICAL INSTRUMENT

(71) Applicant: The Penn State Research Foundation, University Park, PA (US)

(72) Inventor: David Carl Swanson, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,108

(22) Filed: Oct. 8, 2014

(65) Prior Publication Data

US 2015/0024799 A1 Jan. 22, 2015

Related U.S. Application Data

(63) Continuation-in-part of application No. 13/953,049, filed on Jul. 29, 2013.

(60) Provisional application No. 61/692,778, filed on Aug. 24, 2012, provisional application No. 61/679,153, filed on Aug. 3, 2012.

(51) Int. Cl.
*G10H 3/14* (2006.01)
*H04M 1/02* (2006.01)
(Continued)

(52) U.S. Cl.
CPC ............... *H04M 1/026* (2013.01); *G10H 1/08* (2013.01); *G10H 3/12* (2013.01); *G10H 3/18* (2013.01); *G10H 3/182* (2013.01); *G10H 3/24* (2013.01); *H04R 1/46* (2013.01); *G10H 3/14* (2013.01); *G10H 2220/211* (2013.01);
(Continued)

(58) Field of Classification Search
USPC ............................... 84/723, 733, 734; 381/92
IPC ............................. G10H 3/12,3/14, 3/18, 3/182
See application file for complete search history.

(56) References Cited

U.S. PATENT DOCUMENTS 2,845,491 A 7/1958 Bertram
2,921,993 A 1/1960 Beaverson
(Continued)

FOREIGN PATENT DOCUMENTS

DE 10015762 A1 10/2001
FR 1522906 A 4/1968
(Continued)

OTHER PUBLICATIONS

Garrison, M., "The Encyclopedia of Home Recording: A Complete Resource for the Home Recording Studio," Independent Published Platform, 2011, p. 232, 233, Fig. 130.

*Primary Examiner* — David Warren
(74) *Attorney, Agent, or Firm* — Dinsmore & Shohl LLP; Douglas L. Wathen

(57) ABSTRACT

A dipole microphone assembly for a nearfield sound source has a first microphone and a second microphone. The second microphone is out of phase with the first microphone so as to provide a dipole microphone assembly. Each of the microphones has a port, and a dipole spacing is defined as a distance from the center of the port of the first microphone to the center of the port of the second microphone. The dipole spacing is less than ¼ of a wavelength for the highest frequency of the sound of interest.

19 Claims, 7 Drawing Sheets

(51) Int. Cl.
*G10H 3/12* (2006.01)
*G10H 3/18* (2006.01)
*G10H 1/08* (2006.01)
*G10H 3/24* (2006.01)
*H04R 1/46* (2006.01)
*H04R 3/00* (2006.01)
*H04R 1/08* (2006.01)
*H04R 1/40* (2006.01)

(52) U.S. Cl.
CPC ............... *H04R 1/086* (2013.01); *H04R 1/406* (2013.01); *H04R 3/005* (2013.01); *H04R 2410/07* (2013.01)

(56) References Cited

U.S. PATENT DOCUMENTS

| | | | |
|---|---|---|---|
| 3,301,118 | A | 1/1967 | Keane et al. |
| 4,025,724 | A | 5/1977 | Davidson, Jr. et al. |
| 4,193,332 | A | 3/1980 | Richardson |
| 4,748,886 | A | 6/1988 | De Byl |
| 5,010,803 | A | 4/1991 | Donnell |
| 5,223,660 | A | 6/1993 | Wahlgreen |
| 5,526,430 | A | 6/1996 | Ono et al. |
| 5,559,893 | A | 9/1996 | Krokstad et al. |
| 5,614,688 | A | 3/1997 | Donnell |
| 5,651,074 | A | 7/1997 | Baumhauer, Jr. et al. |
| 5,673,325 | A | 9/1997 | Andrea et al. |
| 5,969,838 | A | 10/1999 | Paritsky et al. |
| 6,041,127 | A * | 3/2000 | Elko ................................ 381/92 |
| 6,121,528 | A | 9/2000 | May |
| 6,157,724 | A | 12/2000 | Kawakami |
| 6,191,346 | B1 | 2/2001 | Swan |
| 6,191,348 | B1 | 2/2001 | Johnson |
| 6,441,292 | B1 | 8/2002 | Donnell |
| 6,525,993 | B2 | 2/2003 | Wake et al. |
| 7,024,006 | B1 | 4/2006 | Schwartz et al. |
| 7,297,863 | B2 | 11/2007 | May |
| 7,466,838 | B1 * | 12/2008 | Moseley ........................ 381/370 |
| 7,534,954 | B1 | 5/2009 | Cassista |
| 7,723,605 | B2 | 5/2010 | Gremo et al. |
| 7,844,069 | B2 | 11/2010 | Banks |
| 8,017,849 | B2 | 9/2011 | Tajima et al. |
| 8,098,844 | B2 | 1/2012 | Elko |
| 8,315,418 | B2 | 11/2012 | Watanabe |
| 8,884,150 | B2 * | 11/2014 | Swanson ........................ 84/723 |
| 2003/0121403 | A1 | 7/2003 | Miyagishima et al. |
| 2005/0031136 | A1 * | 2/2005 | Du et al. ........................ 381/92 |
| 2005/0175192 | A1 * | 8/2005 | Herman ........................ 381/94.7 |
| 2006/0178169 | A1 * | 8/2006 | Dunn et al. ................ 455/569.2 |
| 2006/0269089 | A1 | 11/2006 | Gieson |
| 2008/0031726 | A1 | 2/2008 | Bernardus Olthof et al. |
| 2008/0205669 | A1 | 8/2008 | Michelet |
| 2008/0310664 | A1 | 12/2008 | Khenkin et al. |
| 2009/0154715 | A1 | 6/2009 | Lyon et al. |
| 2009/0241756 | A1 | 10/2009 | Tajima et al. |
| 2009/0268899 | A1 * | 10/2009 | Tokuda et al. ............ 379/420.02 |
| 2010/0027808 | A1 * | 2/2010 | Hamada et al. ................ 381/92 |
| 2010/0288109 | A1 | 11/2010 | Van Kelst |
| 2011/0129098 | A1 | 6/2011 | Delano et al. |
| 2011/0194703 | A1 | 8/2011 | Akino et al. |
| 2011/0290098 | A1 | 12/2011 | Thuillier |
| 2011/0311064 | A1 | 12/2011 | Teutsch |
| 2011/0312318 | A1 | 12/2011 | Konchitsky |
| 2012/0060669 | A1 | 3/2012 | Ryan et al. |
| 2012/0060670 | A1 | 3/2012 | Truchsess |
| 2012/0087518 | A1 | 4/2012 | Simidian, II et al. |
| 2012/0215519 | A1 | 8/2012 | Park et al. |
| 2012/0269367 | A1 | 10/2012 | Akino |
| 2013/0112068 | A1 | 5/2013 | Rogers |
| 2013/0230187 | A1 * | 9/2013 | Kuech et al. .................... 381/92 |
| 2013/0272539 | A1 | 10/2013 | Kim et al. |
| 2013/0272540 | A1 | 10/2013 | hgren et al. |
| 2013/0282369 | A1 | 10/2013 | Visser et al. |
| 2013/0282372 | A1 | 10/2013 | Visser et al. |
| 2013/0282373 | A1 | 10/2013 | Visser et al. |
| 2013/0312590 | A1 * | 11/2013 | Truchsess ........................ 84/725 |
| 2013/0317830 | A1 | 11/2013 | Visser et al. |
| 2013/0322637 | A1 | 12/2013 | Akino |
| 2013/0322643 | A1 | 12/2013 | Every et al. |
| 2013/0333546 | A1 | 12/2013 | Kondo et al. |
| 2014/0033904 | A1 * | 2/2014 | Swanson ........................ 84/723 |
| 2014/0067386 | A1 | 3/2014 | Zhang et al. |
| 2014/0270245 | A1 * | 9/2014 | Elko et al. ........................ 381/92 |
| 2015/0024799 | A1 * | 1/2015 | Swanson .................... 455/550.1 |

FOREIGN PATENT DOCUMENTS

| | | |
|---|---|---|
| WO | WO-03041285 A1 | 5/2003 |
| WO | WO-2007106399 A2 | 9/2007 |
| WO | WO-2011087770 A2 | 7/2011 |

* cited by examiner

FIG. 1   PRIOR ART
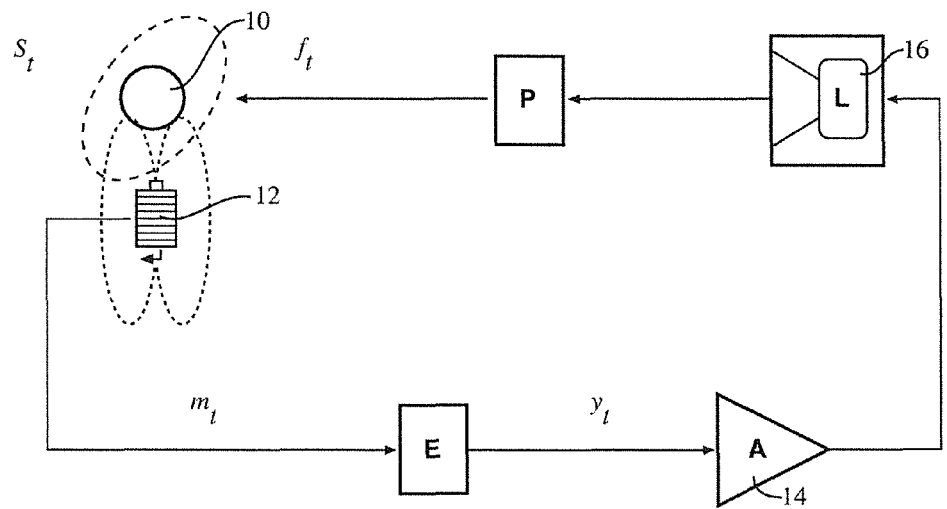
FIG. 2
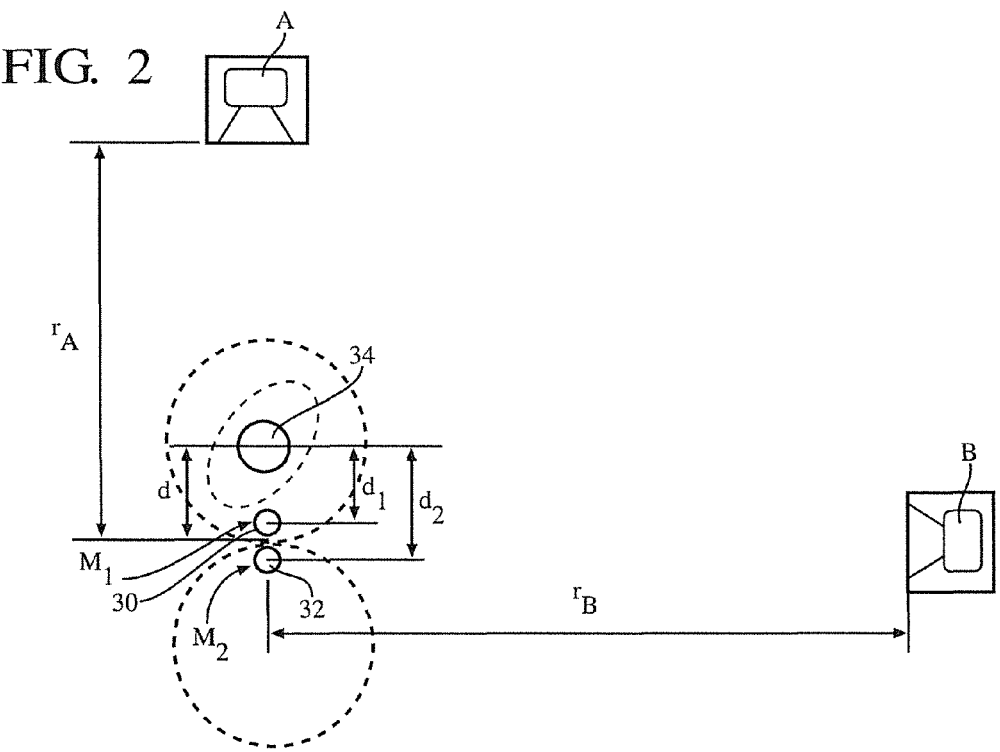

MICROPHONE ARRAY TRANSDUCER FOR ACOUSTIC MUSICAL INSTRUMENT

CROSS REFERENCE TO RELATED APPLICATIONS

This U.S. patent application is a continuation-in-part of U.S. patent application Ser. No. 13/953,049, filed Jul. 29, 2013, which claims priority from U.S. provisional patent application Ser. No. 61/679,153, filed Aug. 3, 2012, and U.S. provisional patent application Ser. No. 61/692,778, filed Aug. 24, 2012, all of which are incorporated herein in their entirety.

FIELD OF THE INVENTION

The present invention relates generally to transducers for converting nearfield sound waves close to the source to an electrical signal for amplification, especially for acoustic musical instruments such as guitars, but also for applications to voice and telephony.

BACKGROUND OF THE INVENTION

While there have been numerous early inventions of the electric guitar, George D. Beauchamp's 1939 patent (U.S. Pat. No. 2,152,783 filed May 26, 1936) can be seen as the first design incorporating a magnetic induction transducer as a means to suppress the problem of acoustic feedback from the amplifier and loudspeaker. Feedback occurs when the guitar transducer senses the amplified signal through the loudspeaker as being as loud as, or louder than, the vibrating string of the guitar. It is still possible to apply enough gain or to place the guitar close to the loudspeaker and create an unstable feedback howling sound, but the magnetic induction pickup has proven to be the most effective at keeping feedback under control. Unfortunately, the electronic signal of a magnetic induction pickup lacks the high frequency structure to reproduce the acoustic guitar sound one hears without amplification. Vibration sensors can be used which offer a closer sound image than the magnetic induction pickup, but the vibration signal is not the same as the acoustic signal and the vibration signal is still sensitive to uncontrolled acoustic feedback. Donnell (U.S. Pat. No. 5,614,688, Mar. 25, 1997) claims a guitar pickup mounting incorporating an internal foam disc to separate the sound from the guitar sound hole from an external amplified loudspeaker to suppress feedback. Such a large foam disc also degrades the sound of the acoustic guitar and has limited effectiveness in suppressing feedback induced vibration in the guitar body. Later Donnell addresses the feedback problem (U.S. Pat. No. 8,035,025, Oct. 11, 2011) using a pair of microphones separated in space, vibration dampened, and with a predetermined time delay added to one microphone of 2/3 of a millisecond as a means of suppressing undesirable feedback from a guitar amplifier. The microphone separation and time delay are large enough to suppress some feedback frequencies but can also create new feedback at different frequencies. Using multiple microphones on complicated sound sources such as grand pianos and drum kits has long been well understood by those skilled in the art of recording music to enhance desirable sounds with particular combinations of microphones, signal phases, and mixing with other transducers such as vibration sensors. This tonal effect is exploited by Ryan (US Patent Publication No. 2012/0060669, Mar. 15, 2012), Truchsess (US Patent Publication No. 2013/0312590, Nov. 28, 2013) and Truchsess (US Patent Publication No. 2012/0060670, Mar. 15, 2012). In the case of cymbals, Ryan and Truchsess note that detecting the out-of-phase vibrations using out-of-phase microphones on opposite sides of the cymbal enhance the more desirable out-of-phase rocking motion of the cymbal while suppressing the less desirable in-phase flapping motion of the cymbal. This is entirely a tonal effect and has nothing to do with feedback suppression. Because the microphone spacing is much more than a wavelength for the frequencies of interest, it can only suppress feedback a particular frequencies while the possibility of feedback at other frequencies is enhanced.

SUMMARY OF THE INVENTION

An embodiment of the present invention provides a dipole microphone assembly where the dipole spacing is less than 1/4 of a wavelength for the frequency range of interest. In some versions, each dipole is in very close proximity to a vibrating acoustic guitar string or sound hole to both faithfully reproduce the sound one hears while also suppressing uncontrolled acoustic feedback from the amplified guitar signal reproduced by the loudspeaker. Some versions also provide an array of dipole microphones, which may be used in close proximite to a vibrating string. The dipole microphone array (DMA) exploits this close proximity to enhance sensitivity to the acoustic waves from the vibrating strings and sound hole of the guitar while suppressing sounds from sources further away, such as a loudspeaker reproducing the acoustic guitar sounds, and thus greatly reduces the possibility of uncontrolled acoustic feedback. Some embodiments include a small baffle in the array, and diffraction over this baffle further improves performance. While the acoustical response of a baffle is well known for both the nearfield and farfield when the source is small compared to the baffle (such as a highway noise barrier), the DMA baffle is actually much smaller than the acoustic source and the nearfield fluid dynamics response of a small baffle is exploited in the present invention to further enhance the acoustic source relative to the undesirable acoustic feedback.

In one embodiment of the present invention, a dipole microphone array is provided for an acoustical stringed instrument of the type having a body and a plurality of strings spaced from the body. The array includes a plurality of microphone assemblies each having a first and a second microphone. The second microphone is out of phase with the first microphone while the voltage sensitivity of each microphone is precisely balanced so as to provide a perfect dipole microphone assembly. This precision balancing of the sensitivities of the two microphones causes acoustic cancellation of the sum of the two microphones to some degree when the microphone separation is 1/2 a wavelength or more, but is most effective at lower frequencies where the separation is 1/4 of a wavelength or less. Each of the microphone assemblies is mounted on the body of the instrument in close proximity to one of the strings. In some versions, each microphone assembly is mounted generally equidistant to two of the strings.

In particular embodiments, the dipole microphone array further includes a rigid support, and the first and second microphones of each microphone assembly are commonly supported on a rigid support frame such as a printed circuit board. The first and second microphones may be soldered or rigidly fastened to the printed circuit board such that vibrations entering each microphone produce a microphone voltage of the same amplitude and phase, and are thus completely cancelled in the output response of each dipole microphone pair.

In particular embodiments, the dipole microphone array further includes a baffle disposed between the first and second microphones of at least some of the microphone assemblies.

The first and second microphones are separated by a first distance and the baffle in some versions has a height equal to or greater than the first distance.

In particular embodiments, the dipole microphone array further includes a vibrationally isolated windscreen disposed around the remainder of the dipole microphone array.

In particular embodiments, the first and second microphones define an orientation axis for each dipole microphone assembly and this orientation axis is angled with respect to an axis normal to the strings or other component of the device on which a dipole microphone assembly may be mounted. In some versions, the orientation axis is angled with respect to the axis normal to the strings as a means to control the frequency response of the output signal. The angle of the dipole axis with respect to the axis normal to the strings may range from +90 to −90 degrees. Preferably, the dipole axis is angled in the range of +45 to −45 degrees. The dipole axis may also be angled in the range of −90 degrees to −45 degrees, or from +45 degrees to +90 degrees. Adjusting the angle of the dipole axis will significantly alter the frequency response of the dipole microphone assembly and the sound of the instrument.

In another embodiment of the present invention, a dipole microphone array is provided for an acoustical instrument of the type having a body. The array includes a plurality of microphone assemblies each having a first and a second microphone. The second microphone is precisely out of phase with the first microphone so as to provide a dipole microphone. Each of the microphone assemblies is mounted on the body of the instrument.

In particular embodiments, the dipole microphone array further includes a printed circuit board, and the first and second microphones of each microphone assembly are supported on the printed circuit board. The first and second microphones may be soldered to the printed circuit board.

In particular embodiments, the dipole microphone array further includes a baffle disposed between the first and second microphones of at least some of the microphone assemblies. The first and second microphone are separated by a first distance and the baffle in some versions has a height equal to or greater than the first distance.

In particular embodiments designed for voice, speech, or for other nearfield applications, a single dipole microphone or an array of dipole microphones may be used. In some embodiments, a single dipole microphone may be positioned on a device, creating a single null plane that may be in the same plane as the body of the device. In other embodiments, a dipole microphone array comprising a plurality of dipole microphone assemblies may be used. In some dipole microphone arrays, each dipole pair is alternated in orientation to create a higher-order multipole microphone which cancels far-field sounds from multiple directions while greatly enhancing nearfield sound sources. Alternating the orientations of the dipole microphones in these embodiments creates additional null planes. That is, each dipole microphone creates the inherent null plane defined between its two out-of-phase microphones. When an additional DMA is introduced in an orientation opposite another DMA, a null plane is created between each set of two out-of-phase microphones between the first DMA and the second DMA. This creates an additional null plane similar to that created by each individual DMA, only here, the null plane is created between two out-of-phase microphones on two different DMAs. For example, two dipoles with one pair flipped 180 degrees with respect to the other would make a quadrapole microphone with two orthogonal null response planes to the far field. Four dipoles with alternating pole orientation in a plane would make an octapole with three orthogonal null planes. Other arrays implementing other quantities of dipole microphones may also be used. For example, an array comprising three DMAs, five DMAs, or another plurality of DMAs may be used. Such arrays would make a multipole microphone having a plurality of orthogonal null response planes to farfield acoustic sources. These multiple-dipole array arrangements would be very useful for cell phone use in noisy areas or for use in recording sound sources in the nearfield with very high attenuation of farfield sound.

In another embodiment of the present invention, a dipole microphone assembly is provided for a nearfield sound source. The assembly includes a first microphone and a second microphone, the second microphone being out of phase with the first microphone so as to provide a dipole microphone assembly. Each of the microphones has a port, a dipole spacing being defined as a distance from the center of the port of the first microphone to the center of the port of the second microphone. The dipole spacing is less than ¼ of a wavelength for the highest frequency of the sound of interest. In some examples, this spacing is less than 5 mm. Each microphone may be selected to have substantially identical sensitivity or is balanced as a pair via a potentiometer to have identical sensitivity.

In some versions, each of the microphones further has a diaphragm responsive to sound waves, a microphone port direction being defined as perpendicular to the diaphragm and extending through the port, the first and second microphones being disposed generally in a microphone plane and the microphone port directions both extending on the same side of the plane. The port directions may be generally parallel to each other In some versions, the microphone assembly is mounted to an acoustical stringed instrument of the type having a body and a plurality of strings spaced from the body, the microphone assembly being mounted to the body of the instrument in close proximately to at least one of the strings. Each microphone assembly may be mounted generally equidistant to two of the strings.

In some versions the dipole microphone assembly further includes a printed circuit board and the first and second microphones of the microphone assembly are supported on the printed circuit board for vibration cancellation purposes.

In some versions, a baffle is disposed between the first and second microphones of the microphone assembly. The first and second microphone are separated by a first distance; and the baffle may have a height equal to or greater than the first distance.

In some versions, a vibrationally isolated windscreen is disposed around the microphones.

In some versions, the first and second microphones define an orientation axis for the dipole microphone assembly and the orientation axis is angled with respect to an axis normal to the strings. The orientation axis may be angled with respect to the axis normal to the strings in the range of +45 degrees to −45 degrees.

In some versions, the microphone assembly is mounted to a cell phone.

A further embodiment provides a dipole microphone array for an acoustical source. The array includes a plurality of microphone assemblies each having a first microphone and a second microphone, the second microphone being out of phase with the first microphone so as to provide a dipole microphone assembly. Each of the microphones has a port, a dipole spacing being defined as a distance from the center of the port of the first microphone to the center of the port of the second microphone in a microphone assembly, the dipole spacing for each microphone assembly being less than 5 mm or less than ¼ of a wavelength for the highest frequency of the sound of interest. Each microphone may be selected to have substantially identical sensitivity or is balanced as a pair via a potentiometer to have identical sensitivity.

In some versions, the microphone assemblies are mounted such that each dipole microphone is alternated in orientation with respect to a neighboring microphone assembly.

In some versions, the acoustical source is an acoustical stringed instrument of the type having a body and a plurality of strings spaced from the body, the microphone assemblies each being mounted to the body of the instrument in close proximately to at least one of the strings.

In some versions, the dipole microphone array includes a printed circuit board and the first and second microphones of each microphone assembly are supported on the printed circuit board.

In some versions, a baffle is disposed between the first and second microphones of at least some of the microphone assemblies, the first and second microphone are separated by a first distance, and the baffle has a height equal to or greater than the first distance.

A further embodiment provides a phone having a phone body and at least one dipole microphone assembly supported by the phone body. The microphone assembly has a first microphone and a second microphone, the second microphone being out of phase with the first microphone so as to provide a dipole microphone assembly. Each of the microphones hasing a port, a dipole spacing being defined as a distance from the center of the port of the first microphone to the center of the port of the second microphone. The dipole spacing is less than 5 mm or less than ¼ of a wavelength for the highest frequency of the sound of interest. Each microphone may be selected to have substantially identical sensitivity or is balanced as a pair via a potentiometer to have identical sensitivity. In some versions, the at least one dipole microphone assembly includes a plurality of microphone assemblies each supported by the phone body, the microphone assemblies being spaced apart and mounted such that each dipole is alternated in orientation with respect to a neighboring microphone assembly.

BRIEF DESCRIPTION OF THE DRAWINGS

FIG. 1 is a schematic depicting prior art of a fundamental acoustic feedback problem, showing the transducer response T(f) and feedback loop response E(f)A(f)L(f)P(f), or EALP, which must be less than unity to insure no unstable feedback;

FIG. 2 is a schematic depicting a dipole microphone in close proximity to a vibrating guitar string acoustical nearfield, showing consistent cancellation in the direction of a loudspeaker "B" and low frequency attenuation in the direction of a loudspeaker "A";

DETAILED DESCRIPTION OF THE INVENTION

Figure 3:
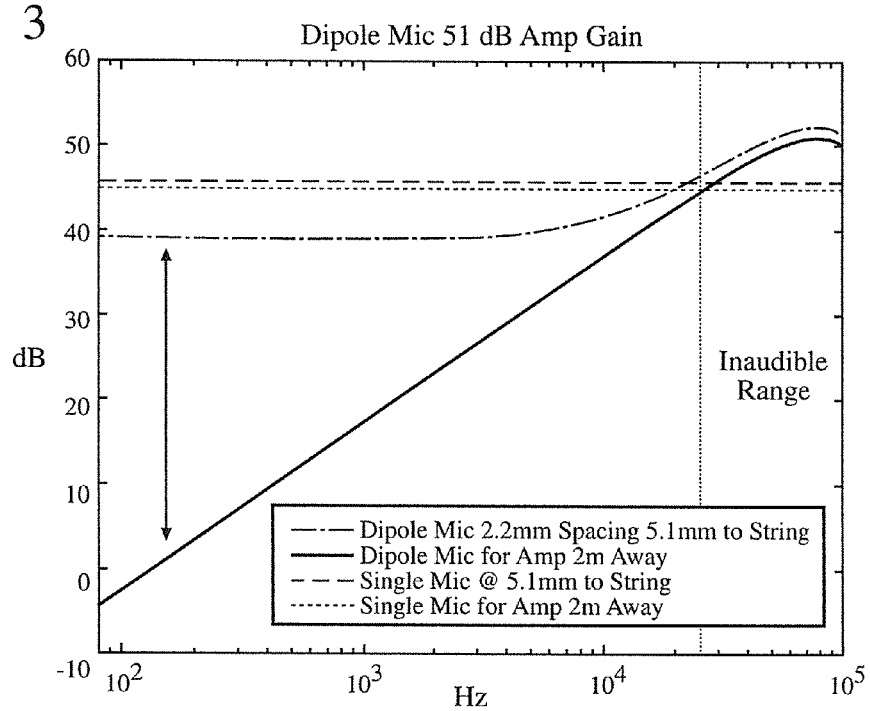
FIG. 3 is a graph comparing a single microphone to a dipole microphone located in very close proximity to a vibrating string, showing an increased stability margin for the dipole microphone at low frequencies.

The present invention provides several embodiments of dipole microphone assemblies for use with nearfield sound sources and with improved resistance to feedback. Some of the embodiments are described in the context of musical instruments, such as a guitar. However, some embodiments are also applicable in other contexts, as will be described.

A fundamental feedback problem is depicted in the prior art of FIG. 1, which shows a signal path from a vibrating string 10, through an induction coil 12, amplifier 14, loudspeaker 16, and back through the air, inducing more vibration into the string and thus causing feedback. Even the induction pickup 12 is susceptible to uncontrolled feedback, but is generally much less sensitive to undesirable feedback compared to a vibration sensor or guitar mounted microphone. Hollow body electric guitars are more sensitive to acoustic feedback than solid body electric guitars because the hollow body vibrates more and this vibration excites the magnetic induction coil and strings more than in a solid body.

Similar problems exist in other applications involving both near-field and far-field sound sources. In these instances, a microphone that is intended to be receptive to a certain sound source, such as a user's voice, may also pick up sound from other, undesired sources. For example, the microphone of a cellular phone may pick up sound from the speakerphone of the device, environmental noise, or sound from other nearby persons. When such sounds are picked up by the microphone, they are transmitted along with the desired sound source and decrease the quality of the sound that is communicated from the microphone.

In the frequency domain, the electrical signal from the pickup (magnetic or otherwise) is defined as:

$$M(f)=S(f)T(f) \quad (1.1)$$

Where S(f) is the frequency spectrum of the string sound to be amplified and reproduced through the loudspeaker and T(f) is the transfer function of the guitar pickup. When the sound F(f) from the loudspeaker feedback into the string is included, this signal becomes (dropping the f for brevity):

$$M = \frac{TS}{1 - EALP} \quad (1.2)$$

Equation 1.2 shows that if the amplifier is switched off (A=0) then the electrical signal reverts to equation 1.1. However, it is well known from control theory that if the magnitude of EALP exceeds unity where |T|>0, it is likely that the feedback will become unstable and lead to uncontrolled oscillations at the maximum volume the amplifier and loudspeaker can produce. Adaptive filters have been used to filter specific frequencies of feedback instability, but this also significantly alters the fidelity of the electric signal created by the guitar pickup.

Figure 8:
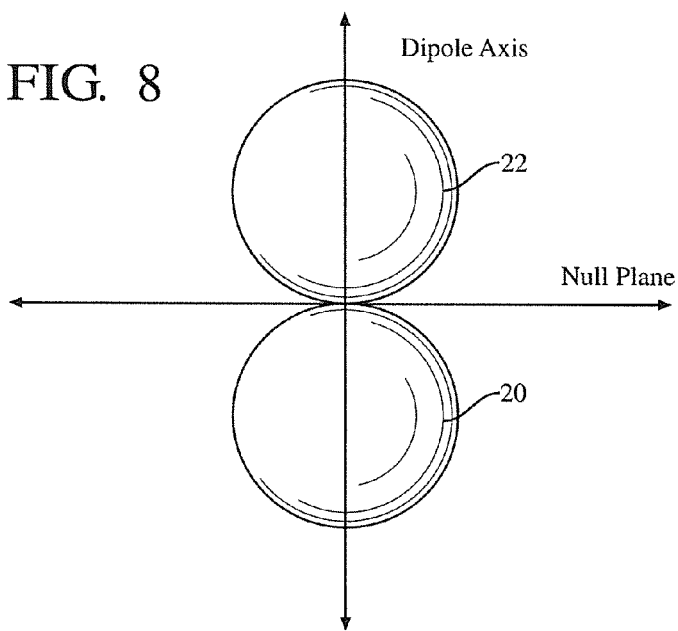
FIG. 8 is a diagram illustrating dipole geometry, showing a dipole axis line and a null plane.

Directional response microphones have been used to suppress distant noise sources. A single omni-directional microphone has the same sensitivity to sound from any direction and is called a monopole. A closely-spaced pair of microphones wired in opposite phase is called a dipole and will produce a "FIG. 8" shaped directivity pattern of sensitivity where the phase opposite sum cancels sound arriving at the microphones from a direction in a plane normal (the "Null Plane") to the axis line of the two microphones (the "Dipole Axis"). FIG. 8 illustrates the shape of the dipole sensitivity. The "sphere" of sensitivity below the Null Plane line, indicated at 20, is out of phase with the sphere of sensitivity above the Null Plane line, indicated at 22. Sound arriving from the Null Plane direction reaches the two microphones at the same time and is cancelled out by their opposite phases. As a sound source moves towards a position aligned with the Dipole Axis, the sound is not completely cancelled out and is therefore picked up and amplified, but less so than if the dipole microphone were a monopole. Combining a dipole and monopole gives a heart-shaped directivity called a cardioid pattern so that the microphone is insensitive to sounds from just one direction. In some embodiments of the present invention, a cardioid microphone arrangement may be substituted for a dipole, but a dipole is preferred. These directivity patterns can also be approximated using a single microphone and multiple acoustic ports to feed in the sound. However, for application to a guitar, a very precise control of microphone location and positioning is required, which is very practical for a permanently mounted guitar pickup. The inventor has found that the preferred method to match the microphones in each dipole is to use a trimming potentiometer such that the microphone sensitivities through the DMA (dipole microphone array) are nearly identical for a distance source, and therefore completely cancelled when added together out-of-phase.

FIG. 2 depicts a pair of closely-spaced microphones, M1 (30) and M2 (32), in very close proximity to a guitar's vibrating string 34. When these microphones are wired in opposite phase (out-of-phase) the sound from loudspeaker "B" on the right arrives at both microphones at precisely the same time and amplitude, thus the electrical sum of the two out-of-phase microphones is zero for all frequencies. In the direction of Loudspeaker "A" (the "worst case" direction) at the top of FIG. 2 the response is a little more complicated. Since the two microphones are separated by a distance $\Delta d = d_2 - d_1$, there is a slight difference in the sound wave amplitude at the two microphones, so the signals do not completely cancel. At lower frequencies f where the wavelength $\lambda = c/f$, (c being the sound speed in air of about 344 m/s), is longer, the cancellation is greater but not total. The directivity pattern remains a "FIG. 8" but the overall sensitivity decreases in the direction of loudspeaker "A" as frequency decreases. At high frequencies where $\Delta d = \lambda/2$, the sound wave from loudspeaker "A" is in opposite phase at the two microphones. Therefore, the out-of-phase electrical sum of the two microphones returns to in-phase and the two signals add, doubling the amplitude. For microphone separations less than wavelength, farfield sound reception is attenuated even along the dipole axis, and is completely cancelled from the null plane directions. This lowest peak will be referred to herein as the "half-wavelength peak" where it is desirable to use the dipole microphone at frequencies well below this point in frequency, such as ¼ wavelength or less. At a higher frequency, where $\Delta d = \lambda$, there would be cancellation in both the loudspeaker "A" and "B" directions giving a "4-leaf clover" type of directivity pattern called a quadrapole. The response in the direction of loudspeaker "A" increases at a rate of 6 dB per octave up to the half-wavelength peak and always cancels in the direction of loudspeaker "B" (i.e. in the direction of the Null Plane). These loudspeakers are assumed to be at far distances $r_A$ and $r_B$ compared to the average microphone distance d to the string. The lower curve in FIG. 3 shows the 6 dB per octave rise in the dipole response to a distant loudspeaker up to the half-wavelength peak.

The response of the dipole microphone in close proximity to the vibrating string is even more complicated than that to loudspeaker "A". The string does not move in unison but "flaps" with both transient traveling impulsive waves and resonating sinusoidal standing waves. In addition, the fluid around the string moves with a complex impedance, entraining air mass in motion with the string surface as well as producing pressure waves which radiate away acoustically at the speed of sound. The air adjacent to the vibrating string surface will also host waves that move both faster and slower than the speed of sound. The latter is known in the acoustics literature as an evanescent wave and is known to decay exponentially, not geometrically as 1/d, as one moves away from the vibrating string surface. This "near acoustic field" is quite different than the "far acoustic field" from the loudspeakers in FIG. 2. Because of this physical nearfield effect and our close proximity, the total sound field is dominated by the nearfield at microphone M1 (30) and it is substantially greater in amplitude than microphone M2 (32). This has the effect of removing the low frequency cancellation for far-field sources and flattening out the frequency response, but only for the string a few millimeters away, not the loudspeaker several meters away. This effect is well known as "the proximity effect" where the bass response of some microphones is boosted when the microphone is placed very close to the sound source.

FIG. 3 is a graph plotting the frequency response of a dipole sensor (in the dot-dash curve) and a single microphone sensor (in the dashed line on top). The peak on the upper right of the graph is at a high frequency well above the range of human hearing and is caused by the dipole microphone spacing of 2.2 mm in this example. A larger microphone spacing in the dipole will cause this peak to be at a lower frequency. Therefore, it is desirable to use a small dipole microphone spacing so that the stability margin between the response of the dipole to nearfield sound sources and farfield sound sources is as large. In the scope of the present invention, a functional frequency response is obtained when the dipole spacing is less than 2 of a wavelength of the highest frequency of interest of the sound source that is being captured by the dipole microphone. Generally, a dipole spacing of less than ½ of a wavelength is functional, less than ⅔ of a wavelength is preferred, less than 3/10 of a wavelength is more preferred, and less than ¼ of a wavelength is most preferred. In the preferred embodiment, the peak of the frequency response to nearfield and farfield sources is above the frequency response of the microphone and above the limit of human hearing. For example, it is desirable that the dipole microphone provide a favorable stability margin within the range of human hearing; that is, between 20 Hz and 20 kHz. In order to accomplish this, the spacing between the two microphones of the dipole microphone is at most one quarter of one wavelength of the highest frequency to be picked up by the human ear; that is, 20 kHz. This corresponds to a maximum functional dipole microphone spacing of about 4.33 mm. In a more preferred embodiment, the dipole microphone spacing may be closer than one quarter of one wavelength of the highest frequency desired sound. In other embodiments, a favorable stability margin may be obtained by basing the maximum possible dipole microphone spacing on the maximum frequency that may be detected by the microphones in the assembly. For a microphone that may detect acoustic signals having a frequency up to 34 kHz, a functional, half-wavelength spacing between the microphones would be about 5.00 mm. In a most preferred embodiment, an even more favorable stability margin could be achieved by placing the microphones of the dipole approximately one quarter wavelength apart, at a distance of about 2.5 mm. In another embodiment, a spacing of 2.2 mm would allow for a frequency range of operation is between 0-40 kHz for the most preferred (i.e. ¼ wavelength dipole spacing) embodiment. At frequencies above the maximum frequency considered when determining the spacing for the dipole microphones, the dipole cancellation becomes ineffective. That is, the stability margin between nearfield and farfield sources becomes so small that they are captured almost identically by the microphones of the dipole. Likewise, the minimum possible spacing between microphones in a dipole may also be taken into consideration when assembling a dipole microphone assembly. The minimum functional spacing between two microphones in a dipole microphone assembly is generally determined by the signal-to-noise ratio of the microphones. That is, because the microphones are wired in an out-of-phase manner, there is a minimum spacing at which the sound captured by each microphone is nearly identical, and the out-of-phase orientation causes the response of one microphone to cancel out the response of the other microphone. In such a situation, the only signal that is left is the electrical noise signal inherently produced by the two microphones. Such a spacing is therefore the minimum possible spacing between two microphones arranged in a dipole. In most embodiments, a practical minimum spacing may be between about 1 mm and 2 mm, inclusive. In the most preferred embodiment the dipole peak is above the frequency response of the microphone as well as the upper limit of human hearing. This most preferred embodiment has a dipole microphone spacing of about 3 mm. For purposes of definition, some embodiments of the present invention may have a microphone spacing of less than 5 mm or in the range of 1 mm to 5 mm. Further embodiments may have a microphone spacing in the range of 1 mm to 4.5 mm, and yet further embodiments may have a microphone spacing in the range of 2 mm to 4.5 mm.

The vertical double-headed arrow on the left side of the graph in FIG. 3 shows the difference in response on a decibel scale between the sound source of a vibrating string 5.1 mm from the dipole center and the sound amplified by 51 dB and reproduced by a loudspeaker $r_A=2$ m away from the dipole as seen in FIG. 2. If this loudspeaker were placed at position B in FIG. 2 at any distance, the dipole response would be less than 0 dB due to the dipole null plane as described in FIG. 8. The double-headed arrow in FIG. 3 shows a difference, or "gain margin" of around 40 dB in the frequency range of 100 to 200 Hz, near most body resonances of a dreadnaught type of guitar meaning that the amplifier gain could be increased even further than 51 dB without causing feedback at the guitar resonances, which is very useful for amplified performances by musicians. So long as the gain margin is greater than a few dB, no unwanted feedback will occur. A gain margin of 0 dB is the same as having a feedback loop gain "EALP=1" in FIG. 1 which will lead to feedback oscillations. A negative gain margin corresponds to EALP>1 which causes growing-amplitude feedback oscillations that quickly saturate the amplifier and annoy listeners. Acoustic feedback suppression along with the flat frequency response to nearby string vibrations for high fidelity signals are the objects of this invention.

Figure 4:
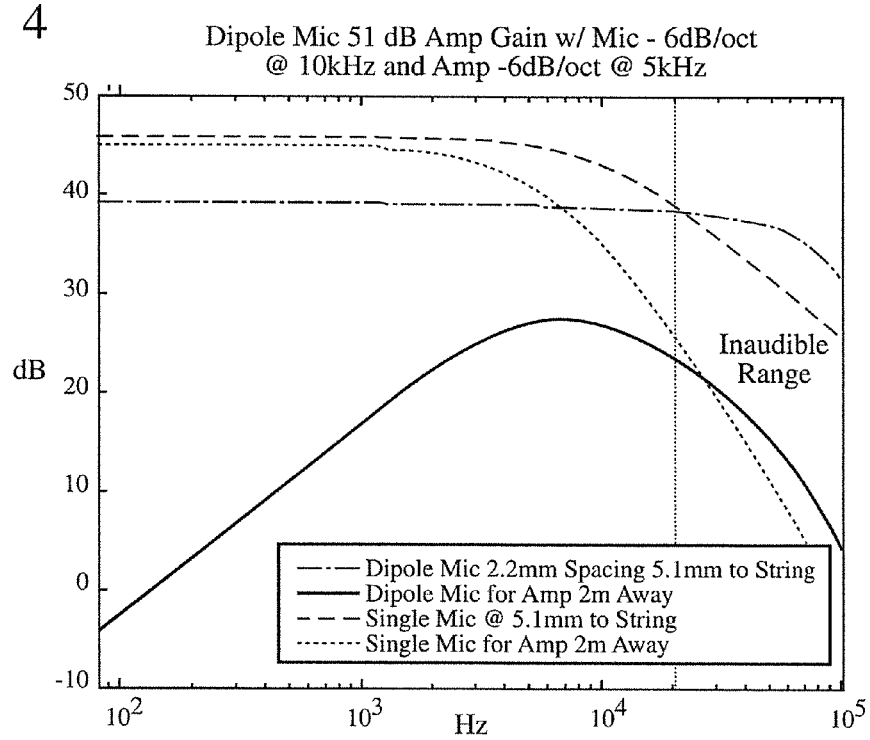
FIG. 4 is a graph depicting the dipole microphone response as flattened out with an increase in gain margin by the addition of some precisely tuned electronic filters.

FIG. 4 shows a practical situation where the amplifier and loudspeaker do not have a flat constant frequency response, but rather have a high frequency roll off of −6 dB/octave around 5 kHz typical of many woofer or mid-range loudspeakers used in guitar amplifiers. In addition, a low pass filter with −6 dB/octave roll off starting at 10 kHz is inserted in the signal path to counteract the dipole peak seen on the upper right of the graph in FIG. 3. The frequency responses for the dipole in FIG. 4 show a nearly perfectly flat (high fidelity) response for the nearby guitar string 5.1 mm away and gain margin of at least 12 dB across the range of human hearing with an amplifier gain of 51 dB. For the situation in FIG. 4 the musician could turn up the amplifier another 10 dB and still not have feedback, yet have a very high fidelity signal from the dipole microphone due to its close proximity to the string sound source. The dipole response seen in FIG. 4 shows a maximum fidelity frequency response to the string while also suppressing amplified acoustic feedback by using additional low pass filtering.

In a dipole microphone assembly, each microphone of the dipole comprises a case in which the microphone diaphragm is disposed. An individual microphone of a DMA measures about 3 mm by 4 mm, although one skilled in the art would understand that other microphone sizes and shapes may be used as well. In a microphone having the dimensions described above, a port in the case of the microphone is disposed about 1.5 mm in from the edge of the microphone. This port may be in the center of the case and centered over the diaphragm, but embodiments in which the port is off-center with respect to the case or the diaphragm are also possible. The port is generally smaller than the microphone diaphragm; in some embodiments, the port has a diameter of about 0.5 mm. When assembling a dipole microphone assembly, the spacing of the microphones is measured from the center of the port of one microphone to the center of the port of the other microphone as seen in 106 of FIG. 12 and FIG. 13.

The location and orientation of the dipole microphones is critical to the frequency response and acoustic feedback suppression because of the close proximity to the strings or other acoustic source and the close separation of the two microphones in the dipole. The position precision must be held constant for the chosen low pass filtering to properly flatten out the frequency response. While the so-called gradient microphones available for speech communications may offer the same far field noise source (i.e. feedback) suppression, the response precision may not be adequate to achieve both the flat frequency response and simultaneous feedback suppression described here. This is because the permanent mounting of the pickup on the guitar relative to the strings, or a dipole microphone on another device close to an acoustic source, can be held constant to a much greater precision than a gradient microphone, with identical acoustic paths to each microphone diaphragm and precisely balanced sensitivities using precision potentiometers.

Figure 5A:
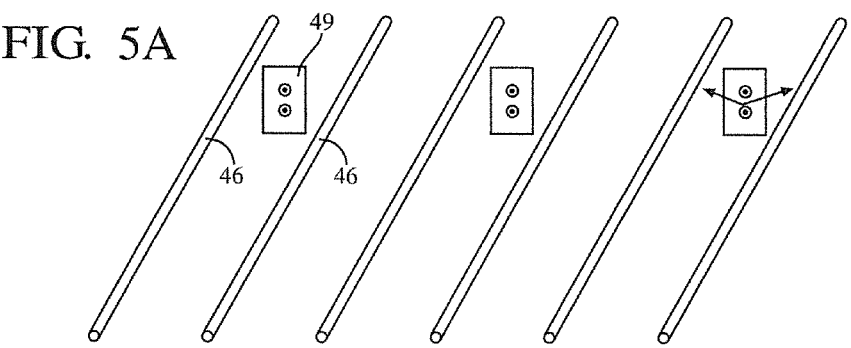
FIG. 5A is a top view of guitar strings and dipole microphones positioned in accordance with an embodiment of the present invention.
Figure 5B:
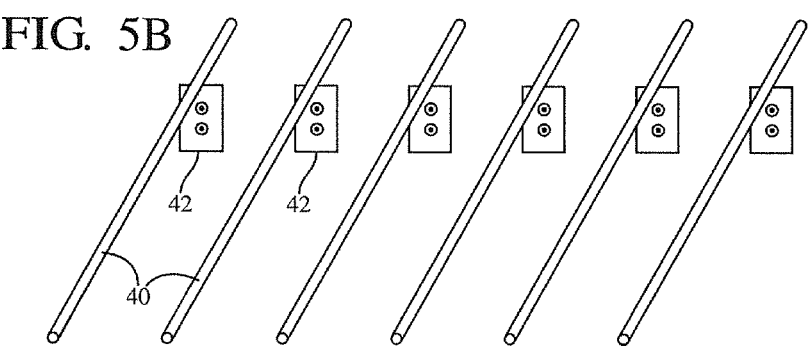
FIG. 5B is a top view of guitar strings and dipole microphones positioned in accordance with another embodiment of the present invention.

Given that the present invention provides control over the dipole microphone locations on the guitar or other device having an acoustic source, it then must be determined how many dipole microphones are needed and where should they be located relative to the strings. FIG. 5B depicts an embodiment of the present invention where each string 40 has a dipole microphone 42 mounted directly below it. The microphone outputs can be summed or recorded and processed separately for this arrangement, which could be useful for special effects processing or triggering polyphonic synthesizers for electronic music. In the embodiment of FIG. 5B, having a six dipole array arrangement, each dipole microphone will provide a well-isolated signal from only the adjacent string. In FIG. 5A a more economic arrangement is seen where a dipole microphone 44 is placed equidistant to each string 46 in a pair of strings. This will result in a lower output, but in many cases this will be quite practical and effective at suppressing feedback and providing a high fidelity string vibration signal, provided the two microphones in each dipole pair have well matched sensitivities as can be implemented using trimming potentiometers. Also, sound holes on all acoustic stringed instruments provide an ideal place to locate the dipole microphone, or a DMA because of the strong acoustic velocity and pressure gradient present in these nearfields. The DMA can also be located over a banjo skin or a resonator guitar vibrating metal cone to produce very high fidelity sound signals with feedback suppression.

Dipole microphone assembly placement is also important in other embodiments not involving a musical instrument. In such an embodiment, the nearfield sound that is to be captured and amplified may be that of one person's voice, or another acoustic source, while the "farfield" sound that is to be cancelled may be background or other environmental noise. Therefore, it is necessary to arrange the dipole microphones in a manner such that acoustic signals from the source of interest are captured and clearly transmitted by one or more dipole microphone assemblies, while the acoustic signals from undesirable, farfield sources are effectively cancelled by the dipole microphone assemblies. One example of such a non-instrument embodiment is a cell phone or other handheld device. In such an embodiment, a plurality of dipole microphone assemblies may be placed on the surfaces of the handheld device, such as front and back surfaces, or edge surfaces. In this instance, one dipole microphone may be placed on the edge nearest to where the user speaks when talking into the phone, and an additional respective microphone is placed on each of the remaining sides of the device. Here, one major nearfield sound source—the voice of the user—will be captured by the dipole microphone assembly placed near the location on the phone into which the user speaks. The other dipole microphone assemblies, however, do not have a respective nearfield sound source. Therefore, these dipole microphones pick up sound from farfield sources such as surrounding people or other background noise, and due to the nature of the out-of-phase dipole microphone assembly, cancel the farfield sound. The signals from each dipole microphone may be summed and transmitted, or in embodiments in which signal processing occurs, the signal from each dipole microphone may undergo signal processing prior to any integration with signals from other dipole microphones. When the signals from the dipole microphones are summed, the dipole microphone capturing the nearfield sound source (the user's voice) transmits a strong signal compared to the weak signals produced by the microphones that capture and cancel farfield background noise. Such an arrangement accomplishes the object of the invention by providing a microphone array that captures the sound from the desired source while cancelling sound from undesired sources. However, alternative embodiments for use with other devices may also accomplish the same object. The prior discussion of microphone spacing is also applicable with respect to other sound sources, and the same values discussed previously apply. For example, some embodiments of the present invention may have a microphone spacing of less than 5 mm or in the range of 1 mm to 5 mm. Further embodiments may have a microphone spacing in the range of 1 mm to 4.5 mm, and yet further embodiments may have a microphone spacing in the range of 2 mm to 4.5 mm. A valuable attribute of the DMA applied to a telephone is that the farfield cancellation is achieved with much less electrical power and component volume than alternatives using signal processing techniques.

Figure 6:
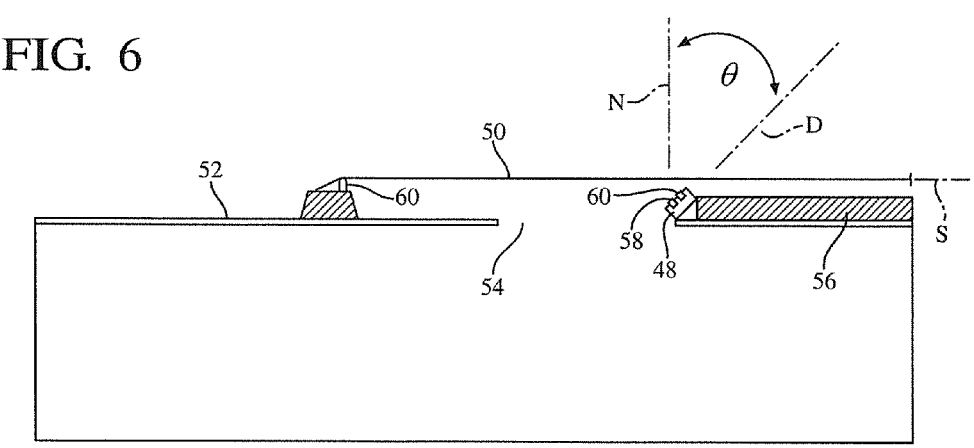
FIG. 6 is a cross-sectional side view of a portion of a guitar showing an orientation axis, θ, of a dipole microphone relative to a string, top plate, and sound hole for controlling the overall electronic fidelity.

Returning to the guitar application, there is also a sensitivity response to the vertical axis of the dipole microphone 48 relative to the string 50, top plate 52, and sound hole 54, as seen in FIG. 6. FIG. 6 shows the dipole microphone with an orientation axis D tilted toward the fingerboard 56 so as to form an angle θ with respect to an axis normal N to the string axis S. As shown, the microphone axis D is an axis extending through the two component microphones 58 and 60 forming part of the dipole microphone assembly 48. The portion indicated at 48 may be considered a base. As the orientation axis D tilts back away from the bridge 60, the null response of the dipole microphone 48 (as in the direction of loudspeaker B in FIG. 2 or in the null axis of FIG. 8) can be pointed in the direction of where the guitar player plucks the string or strikes the strings with the pick, thus attenuating the pick sound. Also, the sound radiating from the sound hole 54 can be exploited by tilting the axis D along the acoustic pressure gradient from the sound hole. This would have the effect of boosting the low frequency sounds from the guitar as a system, but would also affect the design of the frequency compensation filters. As will be clear to those of skill in the art, the orientation axis of the dipole microphone may be adjusted to various angles and this will affect the frequency response of the DMA in a profound way. If the orientation axis D is 90 degrees to the string axis S, the null plane will be normal to the string, which is not a particularly useful position since both sound from the sound hole and sound from the string would be cancelled. By tilting the axis, the position of the null plane can be tuned to reduce noise at particular areas, such as the pick area, and to greatly affect the balance between the bass response of the guitar and higher frequencies from the stings. In some embodiments, it is preferred that the orientation axis be in the range of +/−45 degrees from normal to the strings, though other ranges are possible. For example, the orientation axis may also be in the range of −90 to −45 degrees from normal to the strings, or from +45 to +90 degrees from normal to the strings. Also, in further embodiments, it may be preferred to place the DMA over the sound hole or to allow the player to blend the output signals from several DMA pickups simultaneously. The DMA array may also be skewed so that the dipole microphones near the treble strings are at a different distance from the bridge than the bass strings. The variation in positioning offers significant natural tone adjustment, more so than is available from typical "bass" and "treble" tone controls well known to those skilled in the art of audio engineering.

As shown in FIG. 6, the two component microphones, 58 and 60, in the dipole microphone assembly 48 are positioned such that their microphone diaphragms are pointed in the same orientation. As mentioned previously, the microphones, 58 and 60, are electrically wired out-of-phase, causing the described acoustic response of high fidelity for the string and acoustic feedback suppression to connected amplified loudspeakers, but also providing vibration cancellation, which is a very significant component of the feedback path into the guitar pickup. This "vibrationally coherent" orientation of the dipole microphone elements cancels most vibration that couples into both the microphone diaphragms identically due to the small separation and rigid common mechanical mounting of the microphones. This is because the mechanical wave speed between the two microphone elements is many times faster than the acoustical wave speed, thus the vibration components are nearly identical and therefore cancelled due to the out-of-phase wiring. At higher frequencies, above approximately 1 kHz, there is a greater chance of the microphones vibrating independently, allowing leakage through the signal differencing in the dipole circuit. These higher frequencies are more easily isolated from the DMA using foam rubber or other suitable materials as part of the mechanical mounting system. The DMA can also be mounted below the sound hole so long as it is near the edge where the sound pressure gradient is relatively high, which gives a preferred sound quality.

Since the microphones in the dipole are so closely spaced, they also must be carefully matched in sensitivity to achieve the widest frequency response and best feedback suppression. This can be adjusted individually in the associated electronics, but fortunately, new microphone manufacturing technology is making this less of a concern. New micro electromechanical sensors (MEMS) techniques have created a reasonably consistent frequency response microphone made out of silicon that differs mostly in the net sensitivity (a simple voltage conversion scale factor). It is most desirable that the two microphones used in a particular dipole microphone be matched in sensitivity and frequency response. It is desirable that all dipole microphones in the array be identical, if possible. This can be achieved in DMA production using an automated test and calibration process where all the microphones are exposed to the same sound pressure level and a computer measures the net sensitivity of each microphone and adjusts a digital potentiometer to permanently match the responses of all the microphones in the DMA device. This provides the best possible performance and also provides for certified quality assurance and an opportunity to write a digital serial number and calibration data into the DMA device using a small digital memory chip, or even an RFID chip with data storage, to allow wireless remote reading of the DMA serial number and potentiometer positions. Digital potentiometers and electrically programmable read-only memory chips are available in surface mount chip sizes as small as 2 mm by 2 mm, allowing the DMA array, instrumentation amplifiers, digital potentiometers, and electronic filters to all fit on a single side of a printed circuit board small enough to fit under the strings at the end of a guitar fingerboard, or another location on a handheld or other device. However, since no two microphones will have identical potentiometer settings, the combination of the manufacturing serial number and the potentiometer settings provides for a unique authentication code for each manufactured DMA device, since these numbers would also be cataloged by the manufacturer. This preferred DMA calibration process not only allows for automated quality assurance, but also provides an effective means to detect counterfeit DMA products in the marketplace. It is also possible to select two MEMS microphone from the same manufacturing wafer which have nearly identical sensitivities to avoid using the potentiometer trimming to balance the dipole, then using the trim potentiometers is preferred to provide the maximum farfield cancellation performance.

This embodiment is well-suited for automated production, quality assurance testing, and calibration. For example, the DMA devices can be produced in the same manner as all surface-mounted electronic circuit boards. The portion of the DMA indicated at 48 in FIG. 6 may represent a base, such as a portion of a printed circuit board or a housing around a circuit board, and the microphones 58 and 60 are supported on the circuit board, such as by soldering. The circuit boards can be loaded into an automated testing/calibration fixture where all microphones are exposed to the same sound pressure level, a computer measures the electrical signals from each microphone, digital potentiometers trim the microphone electrical signals to be of identical sensitivity, and the calibration result, DMA serial number, and other digital information is stored on the DMA circuit board in a read-only memory chip. The rigid printed circuit board design of the DMA is also the preferred embodiment for maximum vibration cancellation in the DMA at low frequencies for each microphone pair. While a typical 6-string guitar pickup would require 3 DMA microphone pairs (see FIG. 5A), the preferred embodiment is to manufacture the DMA as a pair of microphones and supporting electronics and memory chip on a small rigid printed circuit board. Multiple DMA microphone pairs would be connected together as needed to create the DMA array size required for the particular instrument or other device using a common signal, DC power, and ground bus. This preferred embodiment allows the DMA microphone pairs to be placed as needed in different locations on the musical instrument, such as inside "F-holes", under the strings, inside the sound hole, over resonators, etc., to achieve the desired natural sound. The DMA microphones may also be placed in various locations on other devices, such as on or in a handheld device, or on a device having DMA microphones designed to be worn by a user. The outputs of each DMA microphone pair can be simply summed, or mixed together, with appropriate gains to balance the tone of the overall DMA output. These specific design choices provide a path for economical manufacture, quality assurance, counterfeit detection, and high performance.

Figure 7:
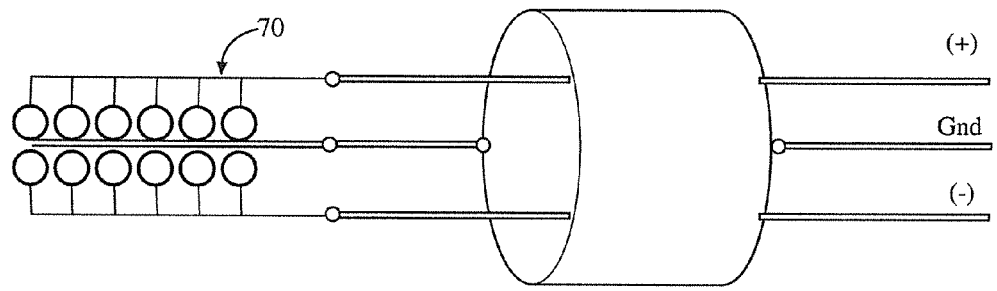
FIG. 7 is a schematic showing top and bottom rows of microphones that are summed together, in accordance with an aspect of the present invention, to reduce a loss of performance from individual microphone sensitivity variability while also allowing for a convenient low impedance balanced line output.

As will be clear to those of skill in the art, a sensitivity mismatch in dipole microphone pairs will lead to lower performance and variable sensitivity to each string or other acoustic sources. According to a further aspect of the present invention, this may be addressed by connecting a number of microphones together such that their aggregate outputs add together. The variability of each microphone is therefore significantly less important to the cancellation performance of feedback from a distant amplified loudspeaker. FIG. 7 shows such a microphone arrangement 70, which conveniently also provides for a balanced line output when the output impedance of the microphone array is below around 600 ohms. This arrangement still benefits from each microphone having a digital potentiometer to precisely match sensitivity during a quality assurance production step, but is enhanced further by the averaging effect of summing the microphone outputs. While this method of achieving the DMA is not as precise as using digital potentiometers to balance each microphone pair, it is much less costly for manufacturing.

If a high impedance output is desired, one skilled in the art can simply use an instrumentation amplifier or an audio transformer to convert the balanced output to a high impedance output. Balanced line outputs have the advantage of common mode interference cancellation. However, for the dipole array in FIG. 7, only differences in sound pressure between the top row of microphones and the bottom row of microphones will result in a signal between the (+) and (−) wires. This embodiment naturally cancels feedback from distant amplified sound as well as vibration and external electromagnetic interference. Using MEMS type of microphones with built in amplifiers, the summed array output impedance can easily drive the 600 ohm balanced line impedance and be powered via phantom power. This is a widely used technique for providing a 48 dc Volts power (10 ma of current) source over the balanced line wires without interfering with the audio signals on the wires. The array of MEMS can be powered using phantom power and a regulator where all components can be configured on a single compact printed circuit where only the signal cable needs to be attached, thus reducing manufacturing costs substantially. However, this arrangement works best if each microphone is trimmed with a potentiometer to have nearly identical sensitivity over the frequency range of interest.

The nearfield of a vibrating string, drum head, reed, or musical horn typically has sound fields where the sound pressure and acoustic particle velocity changes rapidly over small distances. Placing the DMA in these sound "nearfields" produces the desired object of this invention, which is a signal representing the acoustic sound heard with very high fidelity but also with very low sensitivity to nearby amplified sources of the same signal as a means to reduce acoustic feedback. For the guitar string example, assume a 2 mm by 3 mm MEMS microphone, arranged in dipole pairs where the midpoint of the dipole is 6 mm from the string (the microphones are 5 mm and 7 mm from the string respectively). The radial (r is distance) component of the sound field this close to a vibrating string can be seen as that from a vibrating cylinder.

$$P(r) = \frac{k^2 \rho c Q}{4} \frac{\partial}{\partial r}\{H_0^{(2)}(kr)\} = \frac{k^2 \rho c Q}{4} H_1^{(2)}(kr) \tag{1.3}$$

The function $H_1^{(2)}(kr)$ is a Hankel function of the second kind and has an important nearfield property this invention exploits to suppress acoustic feedback from amplified sources of the nearfield sound. The parameter Q is the source strength (m³/s), ρ is the density of air, c is the speed of sound, and k is the acoustic wavenumber $$\left(k = \frac{2\pi f}{c} = \frac{2\pi}{\lambda}\right).$$

As the product "kr" becomes small (the case for low frequencies and small distances from the string) the Hankel function behaves as $$\lim_{kr \to 0} H_1^{(2)}(kr) \approx \frac{1}{r}$$

meaning the sound field decays much more rapidly as distance is increased from the string. This approximation indicated that the sound field drops about 6 dB every doubling of distance. Subtracting the sound level for the 7 mm microphone (143) from the 5 mm microphone (200) leaves a residual of 57, which is attenuated by 10.9 dB from the 5 mm microphone level. Even though the dipole microphones are very close to the string, some small amount of cancellation still occurs. At farther distances from the string, the Hankel function behaves differently. As the product kr approaches unity and greater (approximately frequencies over 120 Hz and distances over 1 m)

$$\lim_{kr \to 1} H_1^{(2)}(kr) \approx \frac{1}{\sqrt{r}}$$

meaning that the sound field drops only 3 dB every doubling of distance. The attenuation increases significantly more in the directions defined by the null plane of the dipole as seen in FIG. 8. The nearfield of the string and sound are even more complicated than the Hankel function description because the acoustic particle velocity dominates the acoustic pressure. Any solid object (a material with high flow resistance) will alter the particle velocity of the acoustic nearfield profoundly causing higher sound field gradients. The sound nearfields of many musical instruments, in particular vibrating strings, drums, reeds, and horns exhibit this strong pressure gradient close to the radiating surface making the DMA an ideal transducer design for capturing the highest quality signal. Furthermore, the DMA design specifically suppresses amplified acoustic feedback signals from nearby amplified sources of the DMA signal.

Figure 9:
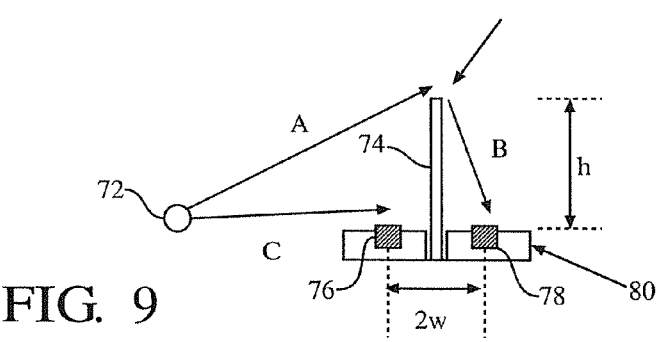
FIG. 9 is a schematic illustrating an addition of a small baffle between two microphones in a dipole, in accordance with a further aspect of the present invention, so as to enhance the signal output for nearfield sounds.

In some embodiments, the DMA sensitivity to the nearfield of the guitar string 72 may be further enhanced by adding a small baffle 74 between the two monopole microphones, 76 and 78, in each dipole microphone assembly 80, as shown in FIG. 9. This baffle, if small compared to wavelength has almost no effect on low frequency sound from a distant source such as the amplifying loudspeaker or other farfield sound source, but has a significant impact on the microphone responses to nearfield sound sources, especially at higher frequencies. This is because the nearfield sound is spreading as a spherical wave or even an exponentially decaying evanescent wave while a far field source produces a nearly plane wave that passes each microphone at nearly the same amplitude. This small baffle needs to be about as high as the two monopole microphone ports are separated to be effective (h≥2 w in FIG. 9). However, if h>λ/4 (a quarter wavelength) the far field plane wave is not cancelled as well in the dipole along its axis, leading to feedback problems, particularly at high frequencies. The length of the baffle should be at least 4 times the height to suppress end-flanking paths of diffraction. This small baffle was found to enhance the signal from the strings by about 6 dB and slightly more for the sound radiating from the sound hole of the guitar with almost no effect on the sound from a distant loudspeaker. Maekawa (Z. Maekawa, "Noise Reduction by Screens," Journal of Applied Acoustics, 1, 157-173, (1968)), and others (S. I. Hayek, "Mathematical Modelling of Absorbant Highway Noise Barriers," Journal of Applied Acoustics, 31, 77-100, (1990)), have shown similar results for outdoor highway noise barriers based on the Fresnel number for the path difference over the barrier relative to the direct path. The typical noise barrier attenuation is well-known in the literature as given in equation (1.4) where N is the Fresnel number.

$$Att_{dB} \approx 20\log_{10}\frac{\sqrt{2\pi N}}{\tanh\sqrt{2\pi N}} \tag{1.4}$$

$$N = \frac{2\delta}{\lambda} \quad \delta = A + B - C - 2w$$

For low frequencies, the wavelength is large compared to the barrier over-the-top path minus the path if the barrier were absent (the path difference) making N very small and the barrier attenuation only slightly over 0 dB, meaning the barrier has virtually no effect on the sound. But for higher frequencies, which have shorter wavelengths, or for sources close to the barrier (the path "C" is small in FIG. 9 for a nearby guitar string), N becomes larger and the barrier attenuation greater. The microphone in the shadow of the barrier receives a weaker acoustic signal so the dipole cancellation is not complete, thus the output of the DMA is higher, enhancing the near-field response and the overall response for higher frequencies. For near-field sources, the different path lengths lead to significantly different spherical spreading losses, which is not the case for far-field sources. Therefore, the small barrier tends to shield a low frequency near-field source much better than a far-field source such that the DMA output signal will end up being louder for a near-field source (such as a nearby vibrating string) compared to a far-field source (such as an amplified loudspeaker) of the same sound level. When the barrier height h is about the same as the microphone separation 2 w in FIG. 9, N is nearly zero for far-field sources since A is approximately C when A and C are large. Thus the barrier has the least effect on far-field sources when h is approximately 2 w (both are a ¼ wavelength or less is preferred). For near-field sound sources A and C are less equal and the barrier functions to enhance the near-field sources along the dipole axis. The barrier has no effect on near or far-field source in the null plane direction.

As such, the small baffle improves the main object of the invention by enhancing the sound from the guitar while maintaining suppression of acoustic feedback from an amplified loudspeaker. However, use of the baffle is not required to exploit the invention. The main effect of the baffle is seen to enhance the near field and high frequencies while having little effect on the far field sound at the expense of a little less feedback suppression at high frequencies. Such a baffle may be included in embodiments for use on musical instruments, handheld or other devices, and other embodiments implementing a dipole microphone assembly.

The explanation of the barrier effect on the nearfield sound using models from highway noise barriers is well known, but incomplete. This is because the highway noise source is actually small in size compared to the barrier while for the DMA near a sound source such as a guitar string, drum, musical instrument, or human voice, the size of the acoustic source is much larger than the barrier size. It is not well-known how the acoustic particle velocity is affected by the barrier in the nearfield. This is a very difficult physical process to model, but we suspect that the barrier is affecting the particle velocity field near the barrier because experimentally we are measuring much greater nearfield signal improvement with the barrier than the highway barrier model predicts. This nearfield effect is very beneficial to the object of this invention.

The DMA can be implemented using microphone pairs (DMA2) on a printed circuit board or similar mechanical mount where several DMA2 devices can be distributed to key sound source areas of the musical instrument and the electrical outputs from two or more DMA2s are electrically summed or "mixed" at proportional voltage levels. This accommodates stringed instruments where the sound hole is not located directly under the strings, such as the "F-holes" on a classical violin, cello, or bass, piano, as well as some guitars and bases with F-holes or offset or multiple sound holes. This is of particular value for resonator guitars where one or more metal diaphragms are excited by string vibrations and the characteristic sound is a mix of resonator vibrations, string vibrations, sound hole vibrations, and body vibrations. For this application a number of DMA2 devices would be placed over the resonator(s), sound hole(s), and/or the strings and electrically mixed to accurately capture the complex acoustic sounds heard. Such an embodiment may also be useful on any device for which it is desirable to detect sound from multiple acoustic sources. For example, multiple DMA2 devices may be distributed on a telephone designed for use in a conference call situation, with DMA2 devices positioned at various locations around the telephone to detect sound from multiple individuals. Such an arrangement would allow for sound originating from multiple individuals at the same time to be captured and electrically summed.

A wind screen surrounding the DMA and diffraction baffle is necessary for use outdoors and to prevent other sources of wind turbulence from detection. Wind screen designs are well known, and generally consist of a thin barrier of around 50% porosity, and in the case of the DMA, should be vibrationally isolated from the baffle and DMA supporting structure to prevent vibrations on the wind screen from exciting the microphones mechanically. For this reason, it may be desirable to place the DMA inside the sound hole (or F-hole) of a stringed instrument and to cover the inside of the sound hole or F-hole with a fabric to serve as a wind screen.

While the present invention has been described for use with an acoustic guitar, further embodiments may be used with other instruments. As a first set of examples, DMAs similar to those described herein may be used with other stringed instruments, with the DMAs mounted on the body of the instrument. As described above, this arrangement provides vibrational cancellation. The positioning of the DMAs is chosen and adjusted so as to provide the desired acoustical performance characteristics. In further examples, DMAs may be used on non-stringed instruments, such as brass and wind instruments. In some embodiments, an array of DMAs is used and in certain embodiments the DMAs are again mounted on the surface of the instrument itself, such as the bell of a brass instrument, or near the skins of a percussion instrument.

Figure 10:
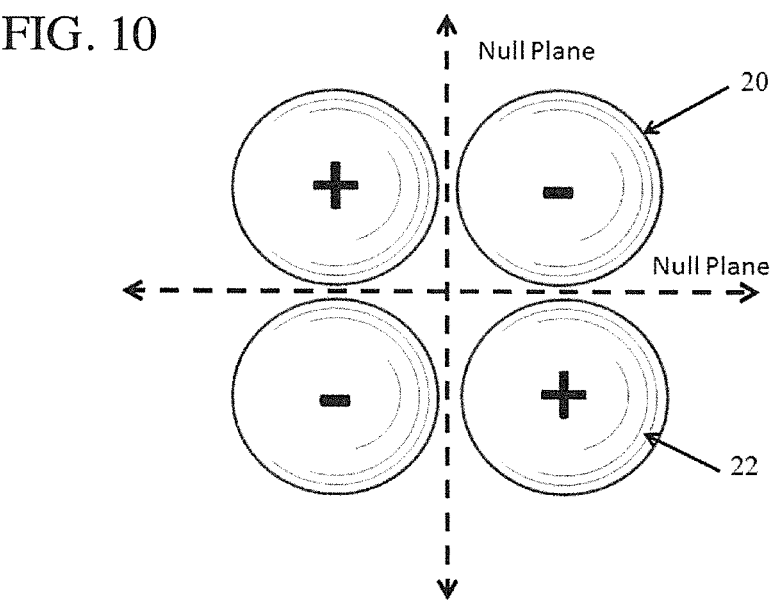
FIG. 10 shows a pair of dipole microphones where one dipole in inverted with respect to the other to create a quadrapole directional response with two orthogonal null planes where farfield sound signals will be cancelled by the array.

In some embodiments the DMA dipoles can be alternated in orientation 180 degrees as seen in FIG. 10, which shows two pairs of dipoles arranged to form a quadrapole response. The quadrapole response forms two orthogonal null planes and the response of the positive and negative phase lobes for farfield sound waves will be even less than that for the single dipole in FIG. 8 provided that the dipole spacing is less than ½ wavelength (¼ wavelength preferred) of the highest frequency acoustic signal that the microphone is intended to capture. As previously discussed, such a spacing ensures that the nearfield acoustic signals are captured, and that the out-of-phase orientation of the microphones in the dipole assembly causes one microphone to produce and transmit a signal, while the other microphone does not produce an out-of-phase signal to cancel it. In such an embodiment, a spacing that is closer to ¼ wavelength is more preferred, with a spacing of about 3 mm being the most preferred. Such a spacing allows for favorable capturing and amplification of nearfield sound, while farfield sounds produce out-of-phase signals that cancel each other out. The 2-dipole arrangement in FIG. 10 would be useful as a microphone for vocals, amplifying horns, woodwind instruments, or drums because the multiple poles would make the DMA less sensitive to orientation when in the nearfield of a large acoustic source. Such an embodiment may also be useful in a cellular phone or other handheld device, as one DMA could be used to capture sound from a nearfield acoustic signal such as a user's voice, while the other DMAs of the multipole could pick up and cancel sound from farfield sources.

Although the present invention has been thoroughly discussed in its application to musical instruments, other applications and embodiments of the invention are possible. For example, the dipole microphone assemblies described herein may be used on a cell phone or other handheld device. In such an embodiment, one, two, four, or some other plurality of DMAs may be positioned on the device. One or more of the DMAs may be positioned to capture sound from nearfield sources, such as a user's voice, while the other DMAs may capture sound from farfield sources, such as background noise or nearby people. Those microphones of a DMA capturing only farfield sound produce out-of-phase signals that cancel each other out, resulting in little or no overall signal being transmitted by these microphones. The DMAs capturing and transmitting nearfield sound produce stronger signals that are then transmitted as desired. In such an embodiment, the DMAs may be arranged adjacently but with opposite orientations to create additional null planes. Such an orientation allows for additional farfield sound to be captured and cancelled.

An additional characteristic of the dipole microphone assembly that makes it particularly useful for applications such as handheld devices and cell phones is that it can achieve cancellation of sound from far-field acoustic sources without signal processing. In the dipole microphone assembly of the present invention, each microphone of the DMA generates a separate, out-of-phase signal. In situations where a DMA captures a farfield acoustic signal, both microphones produce a signal having approximately the same amplitude, but having opposite phases. Because the signals are out of phase, they cancel each other out, and the DMA produces a signal having very little amplitude at all. Note that this cancellation is accomplished entirely by the characteristics of the signals generated by the microphones of the dipole, without the use of signal processing. Because no active signal processing is utilized, DMAs of the present invention are highly energy-efficient, making them ideal for use in handheld devices or other devices in which it is desirable to keep energy costs at a minimum.

The dipole microphone assembly of the present invention may be used in other applications as well. For instance, one or more DMAs may be used to detect very low frequency acoustic signals when placed in close proximity to a low frequency-generating acoustic source. One such embodiment includes a DMA that a user may wear. Such a DMA may be placed close to a user's body in order to detect nearfield acoustic signals coming from the user's body, such as a heartbeat or breathing. A DMA as described herein would be particularly well-suited for such an application, as it could be oriented such that one microphone captures such a low frequency signal before the other, out-of-phase microphone, therefore generating a robust signal. Farfield and background acoustic signals arriving in the null plane of such a DMA would be cancelled and not generate a signal. Of course, multiple DMAs may also be used to create a multipole microphone with similar properties.

Figure 11:
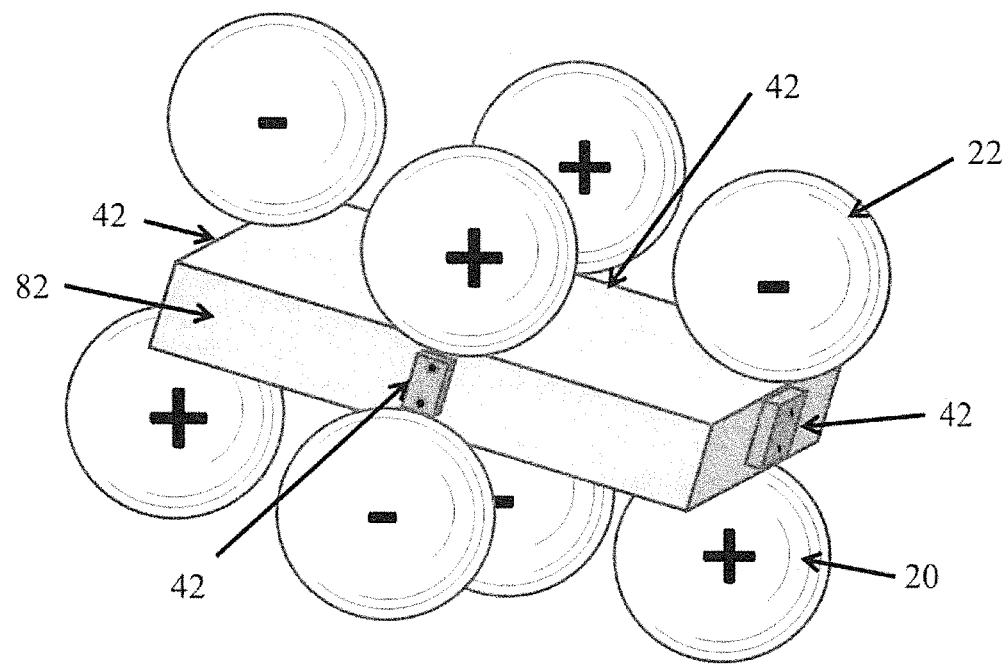
FIG. 11 shows two pairs of quadrapoles made from four dipoles distributed around the edges of a hand-held receiver such as a cell phone or hand held radio to cancel far field sound while enhancing the sound from the human speaker which is in close proximity to the receiver.

Another embodiment of the DMA is seen in FIG. 11 where four dipoles are alternated and placed around the perimeter of a hand-held receiver such as a cell phone. This arrangement leads to an octapole response (three orthogonal null planes) where one of the null planes includes the hand-held receiver body 82 as seen in FIG. 11. Note that when the user speaks into the receiver near one end, one side of the nearest dipole in the DMA receives the voice signal much louder than the other and the signal passes through the DMA with little or no attenuation. For far field noise sources, the opposite is true and the far field noise is suppressed significantly. In the embodiment seen in FIG. 11, the microphones in each dipole pair are spaced less than ¼ wavelength but the separation between dipoles can be much greater to enhance the far field cancellation. Note, this is not the separation between the microphones in a single dipole, but is the separation of the dipoles in a dipole array. The embodiment in FIG. 11 also offers the advantage on little additional electrical power and processing resources compared to digital adaptive techniques for suppressing background noise. For use as a speaker phone, note that the cell phone loudspeakers are naturally located in the null plane of the DMA, simplifying echo cancellation and other noise reduction processing.

Figure 12:
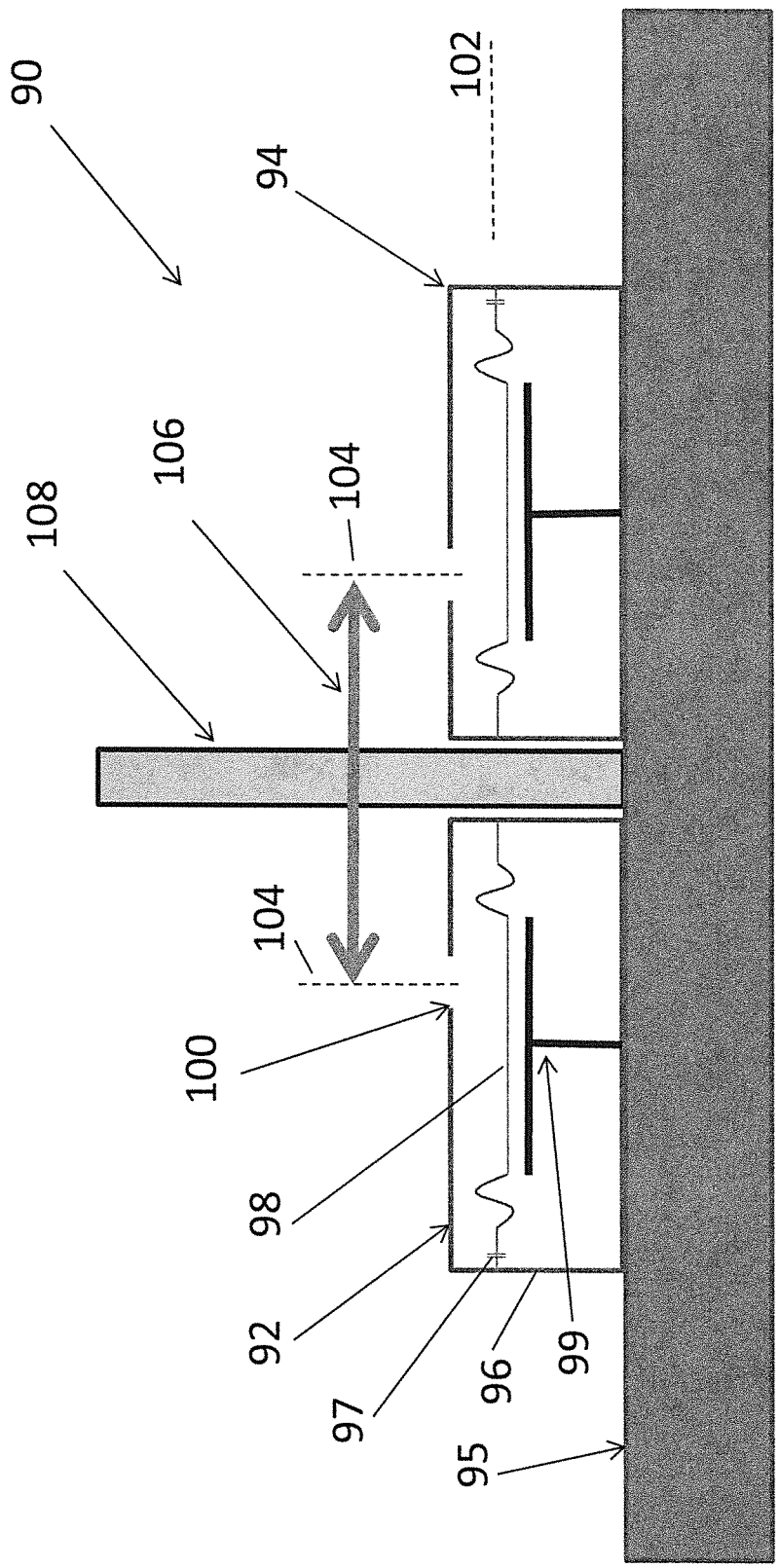
FIG. 12 is a cross sectional side view of a microphone assembly that may be used with the present invention.

Referring to FIG. 12, an exemplary microphone assembly is shown in cross section. The assembly 90 has a first microphone 92 and a second microphone 94, each defined on a printed circuit board 95. In some versions, both microphones are defined on the same circuit board and may be manufactured together, which may reduce or eliminate the need for balancing the microphones. Each microphone has a housing 96 containing a diaphragm 98 that is responsive sound waves. In the illustrated version, a capacitive backing plate 99 is disposed below the diaphragm. As known to those of skill in the art, a small port 97, knows as a barometric equalization capillary port, may be defined through the diaphragm 98 to allow barometric pressures to equalize on the upper and lower surfaces of the diaphragm. A port 100 is defined in the housing 96 so that sound waves may reach the diaphragm. In some microphone designs, the port is centrally located with respect to the diaphragm. In the illustrated design, the ports are offset, which allows closer port-to-port spacing.

In FIG. 12, a microphone plane 102 is shown, with the microphones 92 and 94 being generally in the plane. The microphones are not planar objects and therefore cannot be truly disposed in the plane, but they are generally disposed in the plane, in that they are positioned such that the plane 102 passes through each microphone in the area of the diaphragm. In some embodiments of the present invention, the ports 100 are each directed in the same direction away from the plane. That is, they are both directed to the area on one side of the plane, rather than being oppositely directed. In some versions, the ports are directed in the same direction, meaning that lines extending perpendicularly from the diaphragms 98 through the ports 100 are parallel to each other. Such port directions are indicated by lines 104. The ports 100 are spaced apart by a distance, with a port-center to port-center distance being defined as a dipole spacing 106.

Figure 13:
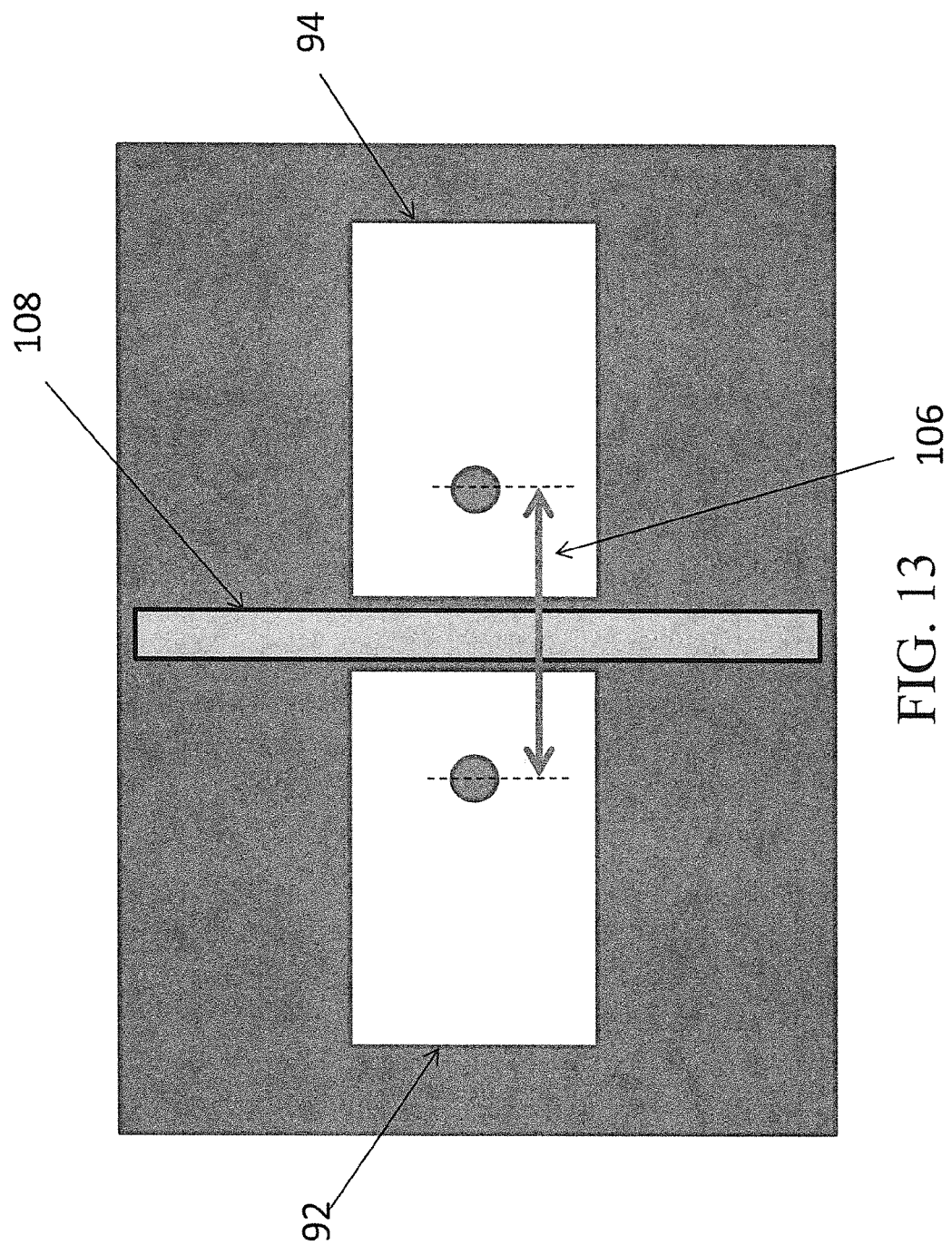
FIG. 13 is a top view of the microphone assembly of FIG. 12.

An optional baffle 108 is also shown in FIG. 12, disposed between the microphones 92 and 94. FIG. 13 provides a top view of the assembly 90. As will be clear to those of skill in the art, the microphones may take different forms than shown.

As will be clear to those of skill in the art, the herein described embodiments of the present invention may be altered in various ways without departing from the scope or teaching of the present invention. It is the following claims, including all equivalents, which define the scope of the invention.

I claim:

1. A dipole microphone assembly for a nearfield sound source, the assembly comprising:
   a first microphone and a second microphone, the second microphone being out of phase with the first microphone so as to provide a dipole microphone assembly;
   each of the microphones having a port, a dipole spacing being defined as a distance from the center of the port of the first microphone to the center of the port of the second microphone, the dipole spacing being less than 5 mm;
   wherein a null plane is defined between the first and second microphones perpendicular to a dipole axis extending between the first and second microphones, and farfield sound from the null plane is cancelled by the dipole microphone assembly.

2. A dipole microphone in accordance with claim 1, wherein each microphone is selected to have substantially identical sensitivity or is balanced as a pair via a potentiometer to have identical sensitivity.

3. A dipole microphone assembly in accordance with claim 1, wherein each of the microphones further has a diaphragm responsive to sound waves, a microphone port direction being defined as perpendicular to the diaphragm and extending through the port, the first and second microphones being disposed generally in a microphone plane and the microphone port directions both extending on the same side of the plane.

4. A dipole microphone assembly in accordance with claim 3, wherein the port directions are generally parallel to each other.

5. A dipole microphone assembly in accordance with claim 1, wherein the microphone assembly is mounted to an acoustical stringed instrument of the type having a body and a plurality of strings spaced from the body, the microphone assembly being mounted to the body of the instrument in close proximately to at least one of the strings.

6. The dipole microphone assembly in accordance with claim 5, wherein:
   each microphone assembly is mounted generally equidistant to two of the strings.

7. A dipole microphone assembly in accordance with claim 5, wherein:
   the first and second microphones define an orientation axis for the dipole microphone assembly; and
   the orientation axis is angled with respect to an axis normal to the strings.

8. A dipole microphone array in accordance with claim 7, wherein:
   the orientation axis is angled with respect to the axis normal to the strings in the range of +45 degrees to −45 degrees.

9. A dipole microphone assembly in accordance with claim 1, further comprising:
   a printed circuit board; and
   the first and second microphones of the microphone assembly being supported on the printed circuit board for vibration cancellation purposes.

10. A dipole microphone assembly in accordance with claim 1, further comprising:
    a baffle disposed between the first and second microphones of the microphone assembly.

11. A dipole microphone assembly in accordance with claim 1, further comprising:
    a vibrationally isolated windscreen disposed around the microphones.

12. A dipole microphone assembly in accordance with claim 1, wherein the microphone assembly is mounted to a cell phone.

13. A dipole microphone assembly for a nearfield sound source, the assembly comprising:
    a first microphone and a second microphone, the second microphone being out of phase with the first microphone so as to provide a dipole microphone assembly;
    each of the microphones having a port, a dipole spacing being defined as a distance from the center of the port of the first microphone to the center of the port of the second microphone; and
    a baffle disposed between the first and second microphones of the microphone assembly, the baffle having a height equal to or greater than the dipole spacing.

14. A dipole microphone array for an acoustical source, the array comprising:
    a plurality of microphone assemblies each having a first microphone and a second microphone, the second microphone being out of phase with the first microphone so as to provide a dipole microphone assembly;
    each of the microphones having a port, a dipole spacing being defined as a distance from the center of the port of the first microphone to the center of the port of the second microphone in a microphone assembly, the dipole spacing for each microphone assembly being less than 5 mm;
    wherein a null plane is defined between the first and second microphones perpendicular to a dipole axis extending between the first and second microphones, and farfield sound from the null plane is cancelled by the dipole microphone assembly.

15. A dipole microphone array in accordance with claim 14, wherein the microphone assemblies are mounted such that each dipole microphone is alternated in orientation with respect to a neighboring microphone assembly.

16. A dipole microphone array in accordance with claim 14, wherein the acoustical source is an acoustical stringed instrument of the type having a body and a plurality of strings spaced from the body, the microphone assemblies each being mounted to the body of the instrument in close proximately to at least one of the strings.

17. A dipole microphone array in accordance with claim 14, further comprising:
    a printed circuit board; and
    the first and second microphones of each microphone assembly being supported on the printed circuit board.

18. A dipole microphone array for an acoustical source, the array comprising:
    a plurality of microphone assemblies each having a first microphone and a second microphone, the second microphone being out of phase with the first microphone so as to provide a dipole microphone assembly;
    each of the microphones having a port, a dipole spacing being defined as a distance from the center of the port of the first microphone to the center of the port of the second microphone in a microphone assembly; and
    a baffle disposed between the first and second microphones of at least some of the microphone assemblies, the baffle having a height equal to or greater than the dipole spacing.

19. A phone comprising:
    a phone body;
    a plurality of microphone assemblies each supported by the phone body, each microphone assembly having a first microphone and a second microphone, the second microphone being out of phase with the first microphone so as to provide a dipole microphone assembly;
    each of the microphones having a port, a dipole spacing being defined as a distance from the center of the port of the first microphone to the center of the port of the second microphone, the dipole spacing being less than 5 mm; and
    the microphone assemblies being spaced apart and mounted such that each dipole is alternated in orientation with respect to a neighboring microphone assembly.

* * * * *